Patented Oct. 11, 1949

2,484,430

UNITED STATES PATENT OFFICE 2,484,430

QUATERNARY SALTS OF POLYVINYL PYRIDINE AND POLYVINYL QUINOLINE

Robert H. Sprague and Leslie G. S. Brooker, Rochester, N. Y., assignors to Eastman Kodak Company, Rochester, N. Y., a corporation of New Jersey No Drawing. Application December 31, 1946, Serial No. 719,624

7 Claims. (Cl. 260—88.3)

1

This invention relates to quaternary salts of polyvinyl heterocyclic nitrogen bases of the pyridine and quinoline series and to a process for their preparation.

In accordance with our invention, we prepare our new quaternary salts by heating the vinylpyridine or vinylquinoline or their polymers with a quaternizing reagent, for example, an alkyl halide, a dialkyl sulfate, an alkyl arylsulfonate, and the like. Where the polymer is first prepared and then quaternized, the polymerization step can be accomplished by the usual methods of polymerizing by the aid of heat, light or a polymerization catalyst such as, for example, hydrogen peroxide, sodium peroxide, salts of perchloric or persulfuric acids, acetyl peroxide, benzoyl peroxide and similar compounds. While the quaternization can be accomplished in mass, superior products can be obtained by conducting the reaction in the presence of an inert solvent, for example, an alcohol, an ether-alcohol, a cyclic ether, a nitro-alkyl, a nitrobenzene, and other similar kinds of solvents, all of which are capable of dissolving the initial monomeric or polymeric reacting components. The quaternized salts obtained by the solvent method of preparation are of more uniform composition and purity than those which can be prepared in mass. The temperature of quaternization can be varied within fairly wide limits, high quality salt products having been prepared with reaction temperatures ranging from 60° to 200° C.

The new quaternary salts of our invention can be illustrated by the following general formulas:

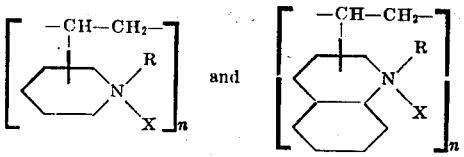

wherein each $n$ is a plural number indicating the group repeats itself sufficient times in a linear chain to form a resinous polymer. R represents an alkyl group (especially a primary alkyl group) and each X represents an anion. More specifically, R is advantageously a methyl, an ethyl, a n-propyl, a n-butyl or an isobutyl group. R can also be n-amyl, isoamyl, n-hexyl, isohexyl, n-heptyl, n-octyl, n-nonyl, n-decyl, n-lauryl, etc. X is advantageously an arylsulfonic acid radical (i. e. an arylsulfonate anion) e. g. a benzenesulfonate anion, a p-toluenesulfonate anion, etc., an alkylsulfuric acid radical (i. e. an alkylsulfate anion), e. g. methylsulfate, ethylsulfate, n-propyl-

2 sulfate, n-butylsulfate, etc. X can also be an iodide anion, a chloride anion, a bromide anion, or other acid radical (anion). The quaternary salts of our invention above defined are valuable precipitants and mordants of acid dyes, and excellent emulsifying agents.

It is, accordingly, an object of the invention to provide new quaternary salts of polyvinyl heterocyclic nitrogen bases of the pyridine and quinoline series. A further object is to provide a process for preparing the same. Other objects will become apparent hereinafter.

The following examples will serve to illustrate further our new salts and the method of their preparation:

Example 1

A mixture of 10.5 grams of 2-vinylpyridine polymer, 18.6 grams of methyl p-toluenesulfonate and 50 cc. of nitrobenzene was heated in an oil bath at 190° C., for a period of 30 minutes. The brown solution was diluted with water and the nitrobenzene removed by steam distillation. The solution was decolorized by boiling with Norite (a decolorizing charcoal) for 10 minutes, filtered and concentrated to 400 cc. under reduced pressure. The solid product of 2-vinylpyridine polymer metho-p-toluenesulfonate was not isolated from the solution.

Example 2

A mixture of 5 grams of 2-vinylpyridine polymer and 10 grams of methyl p-toluenesulfonate was heated in an oil bath at 130° C., for a period of about 16 hours. The brown viscous product was cooled, washed by decantation with two 100 cc. portions of ether and the residue dissolved in 100 cc. of hot methyl alcohol. The solution was filtered, evaporated to dryness, and then stirred with 15 cc. of cold acetone until semicrystalline. The solid was collected on a filter, washed with acetone and dried in vacuo over calcium chloride. The yield of 2-vinylpyridine polymer metho-p-toluenesulfonate (R=methyl) in the form of a brown solid was 7.4 grams.

Example 3

200 grams of 2-vinylpyridine polymer were dispersed in a shaker with 1600 cc. of dry 1,4-dioxane. To the viscous dope thus obtained, there were added 500 cc. of methyl p-toluenesulfonate, and the mixture heated on a steam bath for about 16 hours in an all-glass apparatus equipped with a calcium chloride tube for protection against moisture from the atmosphere. The quaternized polymer precipitated in the form of a cake from solution during the course of the reaction. The supernatant liquid was poured off and the cake dissolved in 4 liters of absolute ethyl alcohol. This dope was then filtered through a Buchner funnel and the resin represcipitated by pouring the filtered dope in a fine stream into 20 gallons of ethyl ether, maintaining agitation during this operation. The resin was subsequently extracted with fresh ethyl ether and the operation of redissolving and reprecipitating repeated once more. Finally the resinous precipitate was washed with Skellysolve G (a low-boiling saturated hydrocarbon) and dried under vacuum, followed by drying at 55° C. in an oven for two hours. Analysis indicated that the product was a high quality 2-vinylpyridine polymer metho-p-toluenesulfonate. It proved on test to be a good mordant of acid dyes and possessing excellent colloidizing properties.

*Example 4*

A mixture of 10.5 grams of 4-vinylpyridine monomer, 18.6 grams of methyl p-toluenesulfonate and 50 cc. of nitrobenzene was heated in an oil bath at 190° C., for a period of about 30 minutes. The brown solution obtained was diluted with water and the nitrobenzene removed by steam distillation. The solution was decolorized by boiling with Norite (a decolorizing charcoal) for 10 minutes, filtered and concentrated to 400 cc. under reduced pressure. The solid product was not isolated from the solution. Analysis and the method of preparation indicated that the product in solution was 4-vinylpyridine polymer metho p-toluenesulfonate. In place of the methyl p-toluenesulfonate in the above example, there can be substituted an equivalent amount of ethyl p-toluenesulfonate, n-propyl p-toluenesulfonate, n-butyl p-toluenesulfonate isobutyl p-toluenesulfonate, methyl benzenesulfonate, ethyl benzenesulfonate, n-propyl benzenesulfonate, n-butyl p-benzenesulfonate, or isobutyl p-benzenesulfonate, to obtain the corresponding 4-vinylpyridine polymer alko-p-arylsulfonates of the benzene series. In similar manner there can be prepared the corresponding salts of 2-vinylpyridine polymer, when monomeric 2-vinylpyridine is used in place of the monomeric 4-vinylpyridine. All of these products are valuable precipitants and mordants of acid dyes and colloidizing agents.

*Example 5*

A mixture of 10 grams of 2-vinylpyridine polymer and 20 grams of diethylsulfate was heated in an oil bath at 130° C., for a period of about 96 hours. The dark brown viscous product was cooled, washed by decantation with two 100 cc. portions of ether and the sticky residue extracted with 600 cc. of hot methyl alcohol. The tarry residue was discarded. The solution was chilled to 0° C., the alcohol decanted off and the rubbery product dissolved in 800 cc. of hot methyl alcohol. The solution was filtered, boiled 5 minutes with 5 grams of Norite (a decolorizing charcoal) and filtered through a steam heated filter. The filtrate was concentrated to dryness and the residue was dried in vacuo over calcium chloride, the product was obtained as a light gray plastic mass. The yield of 2-vinylpyridine polymer etho-ethylsulfate was 14.3 grams, equivalent to 58 per cent of calculated theoretical yield. In place of the diethylsulfate in the above example, there can be substituted an equivalent amount of dimethylsulfate, di-n-propylsulfate, di-n-butylsulfate, and diisobutylsulfate, to obtain related salts, 2-vinylpyridine polymer metho-methylsulfate, 2-vinylpyridine polymer n - propo - n - propylsulfate, 2-vinylpyridine polymer n-buto-n-butylsulfate, 2-vinylpyridine polymer isobuto-isobutylsulfate, respectively. For the 2-vinylpyridine polymer in the above example, there can be substituted an equivalent amount of 4-vinylpyridine polymer to obtain related quaternary salts corresponding to the above mentioned salts of 2-vinylpyridine polymer.

*Example 6*

1 gram of 2-vinylquinoline polymer was dispersed in 10 cc. of 1,4-dioxane. To the dope obtained, there was added 2 cc. of methyl p-toluenesulfonate. The reaction mixture was heated for 18 hours on a steam bath in an all-glass reflux apparatus, protected from atmospheric moisture by means of a calcium chloride tube. The polymer precipitated from solution as the reaction progressed. The mixture was cooled, the supernatant liquid poured off, and the solid dissolved in 10 cc. of absolute ethyl alcohol. The dope thus obtained was brown in color, and after filtering it was precipitated in 200 cc. of ethyl ether. The granular precipitate was filtered off, washed with fresh portion of ether and dried under constant vacuum. The yield was one gram. Analysis indicated that a good quality 2-vinylquinoline polymer metho-p-toluenesulfonate had been obtained. This product was tested and found to be an excellent precipitant and mordant for acid dyes.

*Example 7*

10.5 grams of 2-vinylpyridine polymer and 21.3 grams of methyl iodide were boiled together under reflux for 48 hours. The non-crystalline mass obtained was extracted with 500 cc. of hot water, the extract filtered to remove a small amount of unchanged polyvinylpyridine and evaporated to dryness. The product was a non-crystalline brown mass which melted between 245° and 250° C. The yield was 15.4 grams of 2-vinylpyridine polymer methiodide. Other alkyl iodides can be used in the above example in place of the methyl iodide, for example, ethyl iodide, n-propyl iodide, n-butyl iodide, isobutyl iodide, n-nonyl iodide, n-decyl iodide.

The solvent method of quaternization is described and claimed in copending application by Louis M. Minsk and William O. Kenyon, Serial No. 719,626, filed Dec. 31, 1946.

What we claim is:

1. 2-vinylpyridine polymer metho-p-toluenesulfonate.

2. 2-vinylpyridine polymer etho-ethylsulfate.

3. 2-vinylquinoline polymer metho-p-toluenesulfonate.

4. An alkyl quaternary salt of a resinous polyvinyl addition polymer of a monomeric vinyl compound selected from those represented by the following general formulas:

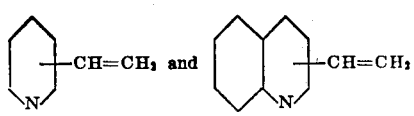

in which the alkyl group is a saturated primary alkyl group containing from 1 to 12 carbon atoms, and the anion is an anion selected from the group consisting of arylsulfonate anions containing from 6 to 7 carbon atoms, alkylsulfate anions containing from 1 to 4 carbon atoms, a chloride anion, a bromide anion and an iodide anion.

5. An alkyl quaternary salt of a resinous polyvinyl addition polymer of 2-vinylpyridine in which the alkyl group is a saturated primary alkyl group containing from 1 to 12 carbon atoms and the anion is an arylsulfonate anion containing from 6 to 7 carbon atoms.

6. An alkyl quaternary salt of a resinous polyvinyl addition polymer of 2-vinylpyridine in which the alkyl group is a saturated primary alkyl group containing from 1 to 12 carbon atoms and the anion is an alkylsulfate anion containing from 1 to 4 carbon atoms.

7. An alkyl quaternary salt of a resinous polyvinyl addition polymer of 2-vinylquinoline in which the alkyl group is a saturated primary alkyl group containing from 1 to 12 carbon atoms and the anion is an arylsulfonate anion containing from 6 to 7 carbon atoms.

ROBERT H. SPRAGUE.
LESLIE G. S. BROOKER.

REFERENCES CITED

The following references are of record in the file of this patent:

UNITED STATES PATENTS

| Number | Name | Date |
| --- | --- | --- |
| 2,138,763 | Graves | Nov. 29, 1938 |

FOREIGN PATENTS

| Number | Country | Date |
| --- | --- | --- |
| 849,126 | France | Nov. 14, 1939 |